M. ALBRECHT.
MOTOR CAR TRUCK.
APPLICATION FILED JUNE 10, 1907.
970,596.  Patented Sept. 20, 1910.
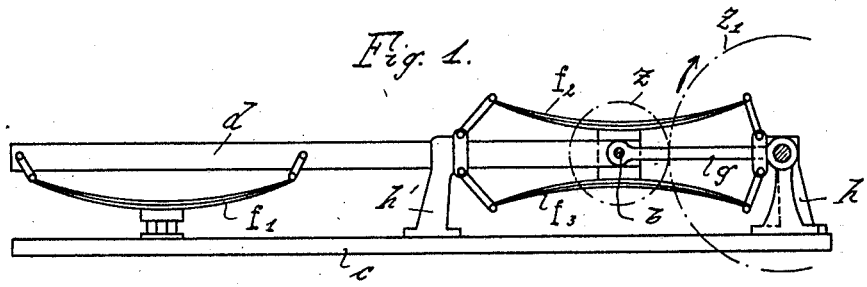
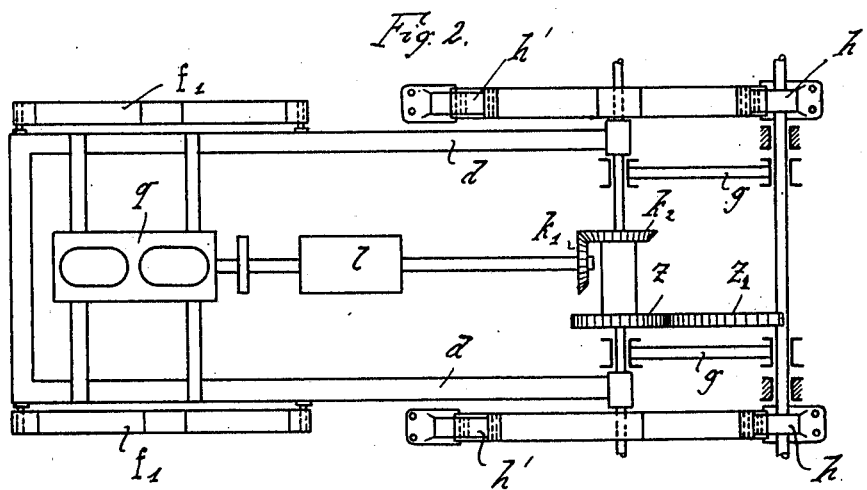

UNITED STATES PATENT OFFICE.

MARTIN ALBRECHT, OF FRIEDBERG, GERMANY, ASSIGNOR TO THE FIRM OF FELTEN & GUILLEAUME-LAHMEYER WERKE ACTIEN-GESELLSCHAFT, OF FRANKFORT-ON-THE-MAIN, GERMANY.

MOTOR-CAR TRUCK.

970,596.  Specification of Letters Patent.  Patented Sept. 20, 1910.

Application filed June 10, 1907. Serial No. 378,274.

*To all whom it may concern:*

Be it known that I, MARTIN ALBRECHT, a subject of the German Emperor, and a resident of Friedberg, in the Grand Duchy of Hesse, Germany, have invented certain new and useful Improvements in Motor-Car Trucks, of which the following is a specification.

My invention relates to improvements in motor car trucks; and the object of my improvements is to provide a truck in which the motor and its gearings are so arranged as to transmit motion to the wheels in an elastic way, and in which the motor is protected against jars exerted on the car wheels. For this purpose, the motor, though having a continuous connection with the wheels receiving the jars, is not rigidly connected therewith, but elastically. To effect this, the frame supporting the motor and its gearing consists of two sections having a pivotal connection with each other, one of said sections having a yielding or spring support on the truck and the other one having a pivotal support thereon. Springs or the like are provided having a tendency to hold the sections of the frame in their normal position against the action of jars exerted on the wheels. A continuous transmission of the energy of the motor to the wheels is preferably obtained by arranging one of the gears of the motor to turn about the axis of the common pivot of the frame sections.

For the purpose of illustrating my invention I have shown an example thereof in the accompanying drawing, in which—

Figure 1, is a side view of a truck embodying my invention, and Fig. 2 is a plan of Fig. 1.

On a truck body $c$ mounted on the wheels of the car a frame is supported comprising separate sections $d$ and $g$. The section $d$ has a yielding support on the truck $c$ by means of springs $f_1$, while the section $g$ has a pivotal support thereon by means of bearing brackets $h$. The sections $d$ and $g$ are designed to support the motor $q$ and its gearing. In the example shown, they are pivotally connected with each other by means of a shaft $b$ having gears $k_2$ and $z$ mounted thereon engaging corresponding gears $k_1$ and $z_1$ respectively. The said shaft $b$ is acted upon by springs $f_2$ and $f_3$ supported in the example shown, on the brackets $h$ and $h'$ of the truck which springs tend to move the sections $g$ and $d$ back into their normal position relatively to each other, when their relative position has been changed by the starting momentum of the motor, or by jars exerted on the truck $c$ during the course of the car.

The function of the system is as follows: On account of the springs $f_1$ at the front part of the truck the motor and its gearing have a soft spring support on the truck. By the gear $l$ and the bevel gears $k_1$ and $k_2$, the spur gear $z$ is actuated, the motion of the latter being transmitted to the spur gear $z_1$ mounted on the axle of the wheel. When the frame swings upward or downward the bevel gear $k_1$ can roll on the bevel gear $k_2$, and also the spur gear $z$ on the spur gear $z_1$, whereby the said swinging movement of the frame can not break the engagement of the motor $q$ and the driving wheel.

When the spur gear $z_1$ is to be rotated in the direction of the arrow shown in Fig. 1, the gear $z$ will have the tendency to roll downward on the gear $z_1$. The tension of the springs $f_3$ will therefore be increased, until the resistance of the gearing system is less, than the pressure of the springs. The spur gear $z$ will therefore be elastically rotated, though the motor $q$ be suddenly started. When the spur gear $z_1$ is to be rotated in a direction opposite that indicated by the arrow of Fig. 1, the spur gear $z$ has the tendency to roll on the gear $z_1$ in an upward direction, so that the elastic transmission of the energy is effected by the springs $f_2$.

In the construction shown the springs $f_3$ support but a small part of the weight of the car, and the frame is held under tension by the upper and lower springs $f_2$ and $f_3$. Therefore when the gear $z$ tends to roll on the wheel $z_1$ in an upward direction, the tension of the lower spring is decreased, while the upper spring is brought into action. On account of the combined tension of the upper and lower springs, the driving wheels can not be suddenly started, but will always be elastically actuated.

I claim:

The combination with a motor car truck, of a two part frame having its members pivotally connected and one of them pivotally connected to the truck, yielding supporting means between the truck and the other member of the frame, oppositely curved springs arranged above and below the pivotally mounted section of the frame and connected at intermediate points in their length with said frame section, the ends of the springs being attached to the truck, and gearing connecting the motor with a driving axle of the truck in all positions of the motor frame.

In testimony whereof I have signed my name to this specification in the presence of two subscribing witnesses.

MARTIN ALBRECHT.

Witnesses:
 JEAN GRUND,
 CARL GRUND.